United States Patent [19]

Contastin

[11] 4,093,176
[45] June 6, 1978

[54] MOLD-LOCKING DEVICE

[75] Inventor: Andre Contastin, Severac-le-Chateau, France

[73] Assignee: Industries et Techniques d'Ameublement, Severac-le-Chateau, France

[21] Appl. No.: 773,780

[22] Filed: Mar. 2, 1977

[30] Foreign Application Priority Data

Mar. 3, 1976 France ................. 76 06603

[51] Int. Cl.² ............ B29C 1/16; B22C 21/08; B65D 45/00
[52] U.S. Cl. ................ 249/167; 24/DIG. 26; 24/248 R; 92/25; 164/386; 269/22; 292/110; 292/256
[58] Field of Search ............ 249/167, 169, 219 R, 249/139, 172; 164/386, 388, 384, 390, 412; 269/22, 25, 27, 31; 24/DIG. 26, 263 DA, 263 DH; 248/226.2; 425/451.9, 432, 179; 292/256, 256.5, 256.65, 110, 129, 144, 201; 92/20, 25, 34

[56] References Cited

U.S. PATENT DOCUMENTS

| 2,035,901 | 3/1936 | Ludington | 292/129 |
| 2,767,011 | 10/1956 | Buckley | 292/144 RX |
| 3,481,076 | 12/1969 | Bedard | 292/144 X |
| 3,589,199 | 6/1971 | Levin | 249/DIG. 4 |
| 3,807,922 | 4/1974 | Holm | 249/172 X |

FOREIGN PATENT DOCUMENTS 220,111  9/1968  U.S.S.R. ................. 249/219

Primary Examiner—Francis S. Husar
Assistant Examiner—John S. Brown
Attorney, Agent, or Firm—Karl F. Ross

[57] ABSTRACT

A mold-locking or catching device which comprises a support on one mold half or part, a bellows anchored to this support at one side of the bellows, a hook engageable with the rim of the other mold half or part and carried by the other side of the bellows and means for swinging the hook laterally into and out of engagement with the rim of the other mold half when the bellows is activated by fluid pressure or depressurized respectively.

4 Claims, 4 Drawing Figures

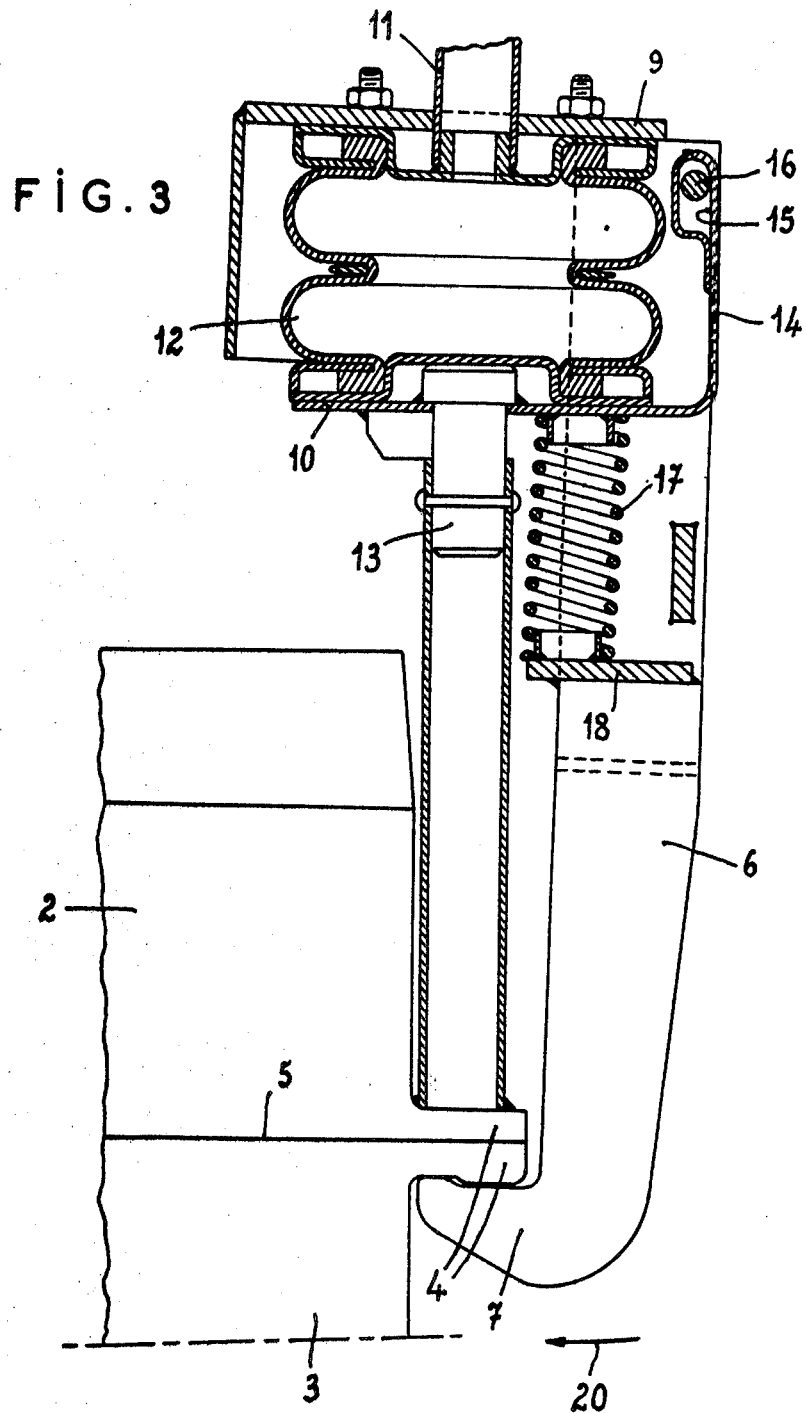

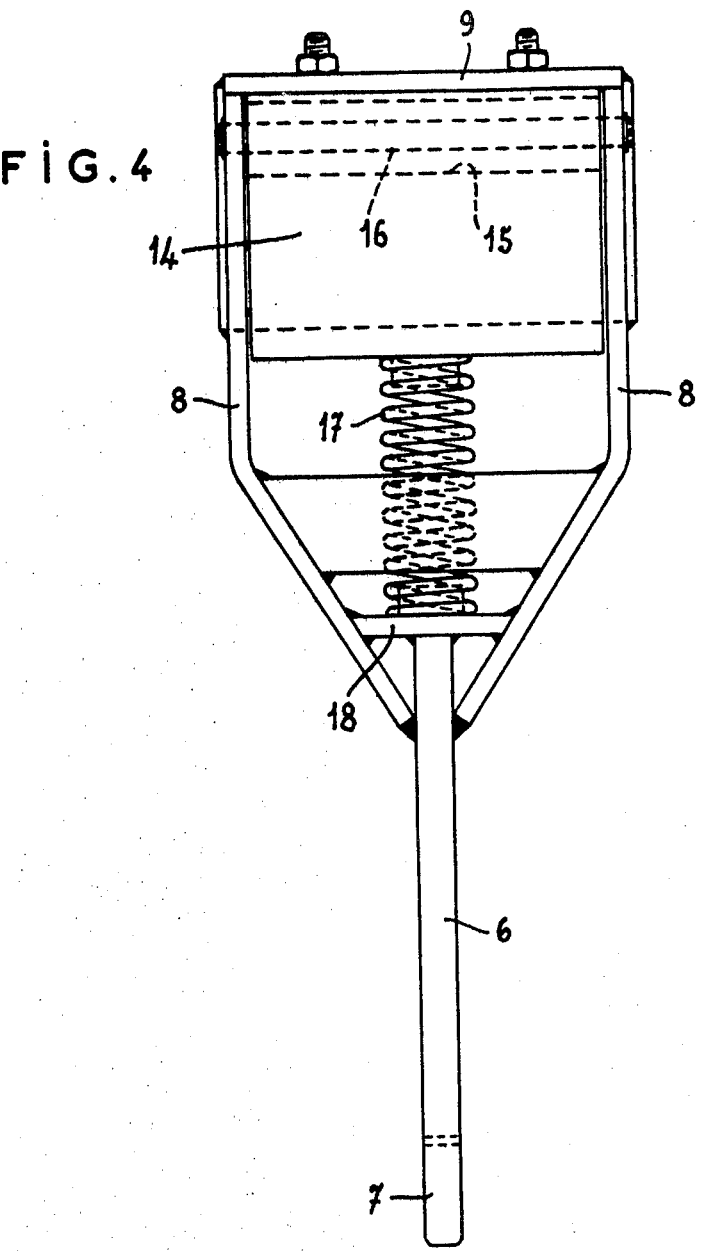

MOLD-LOCKING DEVICE

FIELD OF THE INVENTION

This invention relates to a locking device for a mold.

BACKGROUND OF THE INVENTION

Molds are used for many purposes, such as the shaping of synthetic resins, where in order to create objects of expanded synthetic resins, a relatively small amount of the material is injected into the interior of the mold. The material subsequently expands and assumes the shape of the inner surface of the mold. It is therefore desirable that the mold should be hermetically sealed and, where synthetic resins are used, it is not possible to employ elastomer joints between the mold parts since such seals would be very quickly destroyed by the materials being handled. It is therefore the practice to close the mold by pressing together rims on the mold parts.

At present the locking of molds in their closed position is effected by means of mechanical devices uniformly spaced about the mold periphery and acting on the rims of the two parts of the mold, in order to ensure air-tight closure thereof. Usually the mechanical devices used are eccentrics of toggles.

The disadvantage of such devices is that they produce a force-characteristic curve with an asymptotic shape. Consequently the travel of a locking hook engaging the rims is very limited. Moreover they have a degree of play in the region of the joint plane which should be taken up. This makes it necessary to provide special play-take-up devices and requires frequent adjustment by the operator. Furthermore if the dimensions of the locking devices vary, a poor distribution of the forces between the mold parts is produced, thereby rendering production of an air-tight closure unreliable.

OBJECT OF THE INVENTION

It is the object of the present invention to provide an improved locking device for the two halves of a separable mold, especially for the shaping of expanded synthetic resin bodies, whereby the aforementioned disadvantages are obviated and secure, reliable locking of the mold can be effected without the drawbacks of earlier systems.

SUMMARY OF THE INVENTION

This object and others which will become apparent hereinafter are attained in accordance with the present invention with a locking or catching device which comprises a support on one mold half or part, a bellows anchored to this support at one side of the bellows, a hook engageable with the rim of the other mold half or part and carried by the other side of the bellows and means for swinging the hook laterally into and out of engagement with the rim of the other mold half when the bellows is activated by fluid pressure or depressurized respectively.

Advantageously the latter means includes a compression spring braced between the hook and the support and disposed to swing the hook away from the rim when the bellows is depressurized, the spring being compressed when the bellows is pressurized.

Stop means is provided for limiting the relative displacement of the hook and the support in the depressurized state of the bellows.

The hook can have a lip which engages the rim with a camming action to draw the hook in toward the rim further during the locking of the mold by the drawing of the hook against the rim upon pressurization of the bellows.

According to the present invention, therefore, a locking device for a mold comprises a fixed support member, a flexible bellows mounted on the support member, a movable plate member secured to the opposite end of the bellows, air inlet means passing through the movable plate to the interior of the bellows, a hook-like member rigidly secured to the movable plate and compression spring means extending between the hook-like member and the fixed support member, and there being means to limit movement by the spring of the movable plate towards the fixed support member in the absence of pressure air in the bellows, the latter means causing pivotal movement of the hook-like member.

Thus with the fixed support member located in close proximity to a mould such that the hook-like member lies substantially perpendicular to the joint plane between mold halves, such as by being located on a support post mounted on the rim of the first mold part, the absence of pressure air in the bellows allows the spring means to expand and draw the movable plate towards the fixed plate.

When the movable plate reaches the limit of its available movement, the spring force causes the movable plate and hence the hook-like member to pivot and swing the hook-like member away from the rims of the mold parts.

When pressure air is applied to the bellows to move the movable plate away from the fixed support member, this movement causes the movable plate and hence the hook-like member to pivot in the opposite direction to cause the hook-like member to engage below the rim of, and when there is an upward thrust through the hook and a downward thrust through the support post to lock the two rims together in airtight manner.

It should be noted that this pressure is the same whatever may be the variations of the dimensions of the mold, which eliminates any need for additional operations to take up play. On account of its simplicity the device of the invention is economical, and because it does not possess any wearing parts, it is extremely robust and reliable.

In a preferred embodiment, the movable plate and the fixed support member are situated on the same side of the hook as its rim-engaging lip or finger.

The menas to limit the movement of the movable plate towards the fixed support member is at the opposite side of the hook from the finger or lip, and is preferably formed by an aperture formed on the fixed support, perpendicular to the joint plane of the two mold parts, and by a rod or pin on the hook-like member. Thus, as the rod meets the bottom of the aperture, the continued thrust of the spring means causes the movable plate and thus the hook-like member to pivot, and when pressure air is applied to the bellows upward movement of the movable plate is resisted by compression of the spring to pivot the movable plate and hence the hook-like member in the opposite direction.

BRIEF DESCRIPTION OF THE DRAWING

An embodiment of the invention is described hereinafter with reference to the accompanying schematic drawing in which:

FIGS. 1 to 3 are, respectively sectional side elevations of a device in accordance with the invention in the unlocked position, the position during locking and the locked-up position, and FIG. 4 is a view taken in the direction of the arrow F of FIG. 2.

SPECIFIC DESCRIPTION

Figure 1:
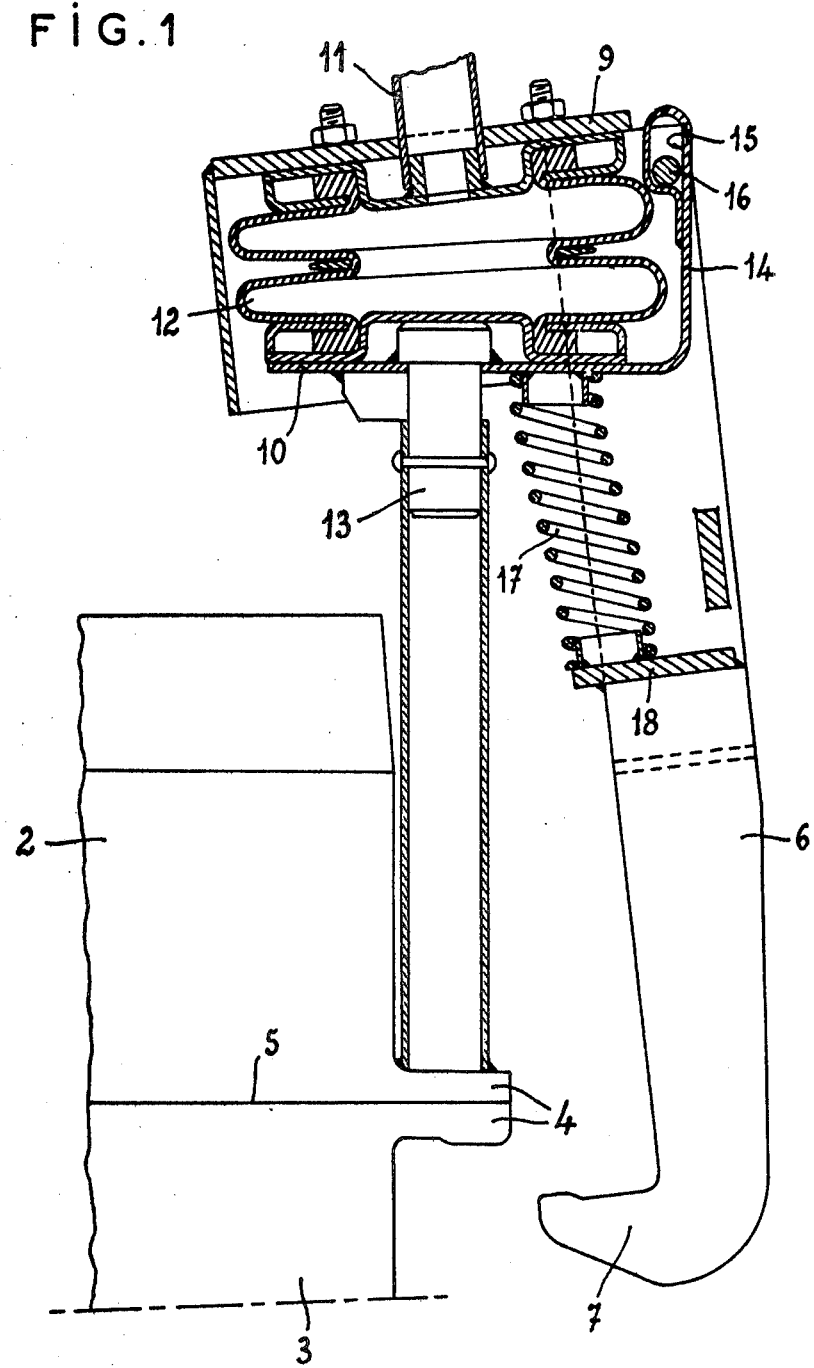

The locking means shown in the drawing is associated with a mold comprising a mold part 2 and a part 3 which, in the closed position of the mold, are in contact along their rims 4 which determine a joint plane 5.

The locking device is formed by a hook 6 whose curved free end finger or lip 7 can engage below the rim 4 of the mold part 3. At its other end, the hook 6 has two parallel arms or straps (FIG. 4) 8 which are rigidly secured to one side of a movable plate 9.

The movable plate 9 is connected to a fixed support 10 by the interposition of a flexible bellows 12 and the plate 9 is traversed by an inlet 11 pipe for the introduction of compressed air to the bellows. The fixed support 10 is connected to a post 13 which in turn is secured to the rim of the mold part 2. The fixed support 10 has an extension 14 extending towards the movable plate 9 in which an aperture 15 is formed perpendicular to the joint plane 5 of the two parts of the mold. The two arms 8 forming one end of the hook 6 are cross-braced by a rod 16 capable of sliding within and being stagged by the bottom of the aperture 15.

The device additionally comprises a helical compression spring 17 one end of which acts on the fixed support 10 and the other end of which acts on a bar 18 cross-bracing the two arms 8 of the hook. It is to be noted that the spring 18 is located on the same side of the hook 6 as the finger 7 of the latter.

As is shown by FIG. 1, in the absence of air pressure in the bellows, expansion of the spring 17 has drawn the movable plate 9 towards the fixed plate 10 until the rod 16 has contacted the bottom of the aperture 15, the spring force then having caused the movable plate 9 and the hook 6 to pivot to draw the finger 7 away from the rims 4.

Figure 2:
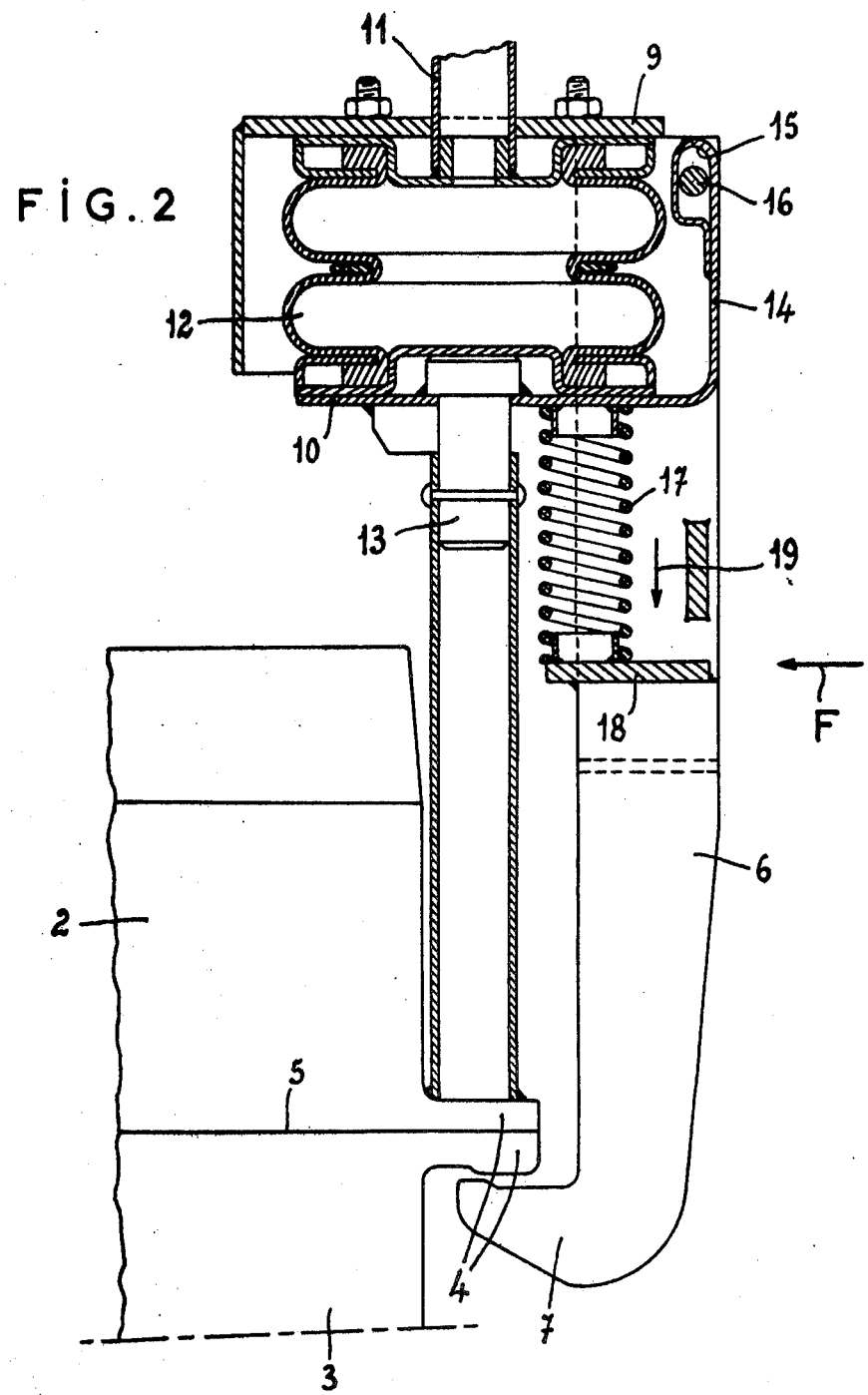

As pressure air is introduced (FIG. 2), the movable plate 9 is urged away from the fixed plate 10 and the thrust of the spring acting on one side of the movable plate through the hook 6 causes that plate and thus the hook to pivot inwardly, until the movable plate 9 is parallel to the fixed support 10, and when the hooked end 7 of the hook 6 lies below the rims 4 of the mold parts. Continued application of pressure air causes a greater upward force on the movable plate 9 and greater compression of the spring 17, the result of which is shown in FIG. 3. The finger and rim have inclined surfaces which cam the hook to the left.

Thus the spring 17 limits the separation between the movable plate and the support 10, and the movable plate 9 tends to pivot relatively to the support 10, the spacing between these two components being less at the hook 6 side than at the other side. This effect tends to make the free end of the hook pivot towards the mold, in the direction of arrow 20 so that this end grips firmly below the rim 4 of the mold, and when the downward thrust through the pillar and the upward thrust through the hook 6 locks the rims together in air-tight manner.

It follows from the above that an appliance of this kind may be very easily automated, for its suffices to control the internal pressure of the flexible bellows 12 to cause the mold to lock-up or to unlock.

The helical compression spring may be replaced by other elastic devices, or the means providing a stop between the movable part 9 and the support 10 may be different without departing in any way from the scope of the invention.

I claim:

1. The combination of a two part mold having engaging rims and a locking device for said mold, said locking device comprising:

a support means fixed at one end to one of said rims;

a flexible bellows mounted at the other end on said support means;

a movable plate member secured to the opposite end of the bellows;

air inlet means passing through said movable plate member to the interior of the bellows;

a hook-like member rigidly secured to the movable plate member; and compression spring means extending between the hook-like member and the fixed support means; and means on said hook-like member and said support means for limiting movement by the spring means of the movable plate member towards the fixed support member in the absence of pressure in the bellows to pivot said hook-like member relative to said mold to engage the other of said rims.

2. The combination defined in claim 1 wherein the compression spring means is a helical compression spring bearing at one end against a bar secured to the hook-like member and at the other end on the fixed support means, the bar being situated to the same side of the hook-like member as a projecting curved finger of the hook-like member.

3. The combination defined in claim 1 wherein the means for limiting movement of the movable plate member towards the fixed support means comprises an elongated aperture formed in the fixed support means and extending perpendicular to the joint plane between the parts of the mold and a rod secured to said hook-line member and extending within the aperture whereby movement of the movable plate towards the fixed support means under the action of the spring means continues until the rod meets the bottom of the aperture, the continued thrust of the spring means causing the movable plate member and thus the hook-like member to pivot.

4. The combination defined in claim 1 wherein the fixed support means includes a post, said post being secured to one of said rims of one of said mold parts.

* * * * *